United States Patent [19]

Moore et al.

[11] Patent Number: 5,732,223
[45] Date of Patent: Mar. 24, 1998

[54] SCSI HOST ADAPTER WITH SHARED COMMAND AND DATA BUFFER

[75] Inventors: Richard S. Moore, Irvine; David J. O'Shea, Newport Beach, both of Calif.

[73] Assignee: Future Domain Corporation, Inc., Irvine, Calif.

[21] Appl. No.: 963,584

[22] Filed: Oct. 20, 1992

Related U.S. Application Data

[63] Continuation-in-part of Ser. No. 667,754, Mar. 11, 1991, abandoned.

[51] Int. Cl.$^6$ ............................................. G06F 13/00
[52] U.S. Cl. ........................................ 395/250; 395/800
[58] Field of Search ............................. 395/325, 375, 395/800, 280, 292, 474, 250

[56] References Cited

U.S. PATENT DOCUMENTS

| | | | |
|---|---|---|---|
| 4,062,059 | 12/1977 | Suzuki et al. | |
| 4,384,327 | 5/1983 | Conway et al. | |
| 4,553,133 | 11/1985 | Peterson et al. | 340/347 |
| 4,635,194 | 1/1987 | Burger et al. | |
| 4,716,525 | 12/1987 | Gilanyi et al. | |
| 4,843,544 | 6/1989 | DuLac et al. | 395/250 |
| 4,933,840 | 6/1990 | Sera et al. | 364/238.3 |
| 5,204,951 | 4/1993 | Keener et al. | 395/325 |
| 5,233,692 | 8/1993 | Gajjar et al. | 395/325 |
| 5,241,630 | 8/1993 | Lattin, Jr. et al. | 395/325 |
| 5,280,601 | 1/1994 | Desai et al. | 395/425 |
| 5,283,872 | 2/1994 | Ohnishi | 395/325 |
| 5,287,463 | 2/1994 | Frame et al. | 395/325 |
| 5,299,315 | 3/1994 | Chin et al. | 395/250 |
| 5,313,588 | 5/1994 | Nagashige et al. | 395/275 |
| 5,333,276 | 7/1994 | Solari | 395/325 |
| 5,404,548 | 4/1995 | Nishioka | 395/800 |
| 5,421,014 | 5/1995 | Bucher | 395/650 |
| 5,428,741 | 6/1995 | Ho et al. | 395/162 |
| 5,450,609 | 9/1995 | Schultz et al. | 395/800 |
| 5,454,085 | 9/1995 | Gajjar et al. | 395/285 |
| 5,504,868 | 4/1996 | Krakirian | 395/375 |

FOREIGN PATENT DOCUMENTS

| | | |
|---|---|---|
| 287301A2 | 10/1988 | European Pat. Off. |
| 451516A1 | 10/1991 | European Pat. Off. |

Primary Examiner—William M. Treat
Assistant Examiner—Zarni Maung
Attorney, Agent, or Firm—Skjerven, Morrill, MacPherson, Franklin & Friel, LLP

[57] ABSTRACT

A small computer system interface (SCSI) controller circuit, connected between a host computer bus and a SCSI bus, includes a storage buffer shared between command and data signals provided by a host computer to a target SCSI peripheral device. The shared buffer includes a bidirectional FIFO which is used for intermediate storage of command blocks between transferred the host and the target device as well as data blocks. In the case of data transfers from the host to the target device, a command block is written to the bidirectional FIFO followed by as much of the data block as will fit in the remaining FIFO space. After the target device has read the command block, it accesses the SCSI bus and begins the transfer of data from the FIFO. In the case of data transfers from the target device to the host, a data transfer command block is first written to the FIFO by the host. The command block is read by the target device which then provides the requested data to the FIFO over the SCSI bus. The host system receives the requested data from the same shared storage buffer to which the command block was written.

15 Claims, 1 Drawing Sheet

SCSI HOST ADAPTER WITH SHARED COMMAND AND DATA BUFFER

CROSS REFERENCE TO RELATED APPLICATIONS

This application is a continuation-in-part application of U.S. Ser. No. 07/667,754, entitled "SCSI Controller", by Allan P. Pease, et al., filed Mar. 11, 1991, now abandoned.

TECHNICAL FIELD

The invention relates generally to computer bus interface circuitry. More particularly, the invention relates to an interface circuit for connecting a computer bus to a Small Computer System Interface (SCSI) bus.

BACKGROUND AND SUMMARY OF THE INVENTION

The Small Computer System Interface (SCSI) is a parallel input/output bus often used to connect disk drives, CD-ROMs, tape drives and other peripherals to a computer bus. The SCSI bus is a bidirectional, multimaster bus which can accommodate peer to peer communications among multiple CPUs and multiple peripherals. Because of this versatility, the SCSI bus is becoming increasingly important in the microcomputer field.

SCSI commands are transferred from a SCSI controller, or host adapter, located in a host computer system, to a target device (such as a disk drive) during the command phase of the SCSI bus. There are two methods of doing this. In the simplest but least efficient method, a system microprocessor (or onboard processor, in the case of intelligent host adapters) polls between command bytes to ensure that there is no overflow of command bytes. The second method is to buffer the command bytes in a FIFO. With this approach, the need for the controlling microprocessor to poll for the status of the SCSI bus is eliminated, and the command transfer can be accomplished more efficiently. Previous designs have used either the polling method, or a command FIFO separated from the data FIFO.

The apparatus of the present invention provides a means for implementing buffered command transfers without a separate FIFO for commands. Commands are instead buffered in the data FIFO.

The present invention generally comprises a complete multifunctional SCSI chip that is in communication with a host bus. The host bus can be either the Industry Standard Architecture (ISA), the Micro Channel Architecture (MCA), or the Extended Industry Standard Architecture (EISA), or other architecture as taught by U.S. patent application Ser. No. 667,754 filed on Mar. 11, 1991, now abandoned, by the inventor of the present invention which application is hereby incorporated by reference.

More particularly, the apparatus generally comprises an internal data bus, a first interface means for coupling the SCSI bus to the internal data bus and a second interface means for coupling the host computer bus to the internal data bus. Control logic gating means are provided for causing data communicated between the SCSI bus and the first interface means to communicate with the internal data bus. The control logic gating means further causes data communicated between the computer bus and the second interface means to communicate with the internal data bus. Control signal means are provided for coupling to the host computer bus.

The apparatus of the present invention is well suited for single chip implementation. A bidirectional first in, first out (FIFO) buffer is used to provide a circuit which supports buffered data transfers.

The SCSI controller of the present invention supports asynchronous and synchronous protocols conforming to the SCSI specification known as the SCSI-II specification proposed by the American National Standards Institute (ANSI) and further described in the X3.131-198x; X3 Project 503-D prepared by the Technical Committee X3T9of the I/O interface accredited Standards Committee, X3-Information Processing Systems. These documents are also hereby incorporated by reference.

The apparatus of the present invention further includes logic circuitry for handling SCSI bus arbitration, automatic generation of request/acknowledge handshakes, and interrupts on various SCSI status conditions. The apparatus provides FIFO buffering of data and command bytes from data bytes in a single FIFO with minimal additional logic. In both data in and data out transfers, the significant advantages provided by the apparatus of the present invention are first, that no polling is required when the host is writing command bytes to the FIFO, which significantly speeds up the completion of command transfers, and second, only one main FIFO, shared by both command bytes and data bytes, is required. Smaller secondary FIFOs are required for data bytes in synchronous transfer modes only.

For a more complete understanding of the preferred embodiment of the present invention and its many objects and advantages, reference may be had to the following detailed specification and to the accompanying drawings.

DESCRIPTION OF THE PREFERRED EMBODIMENT

Figure 1:
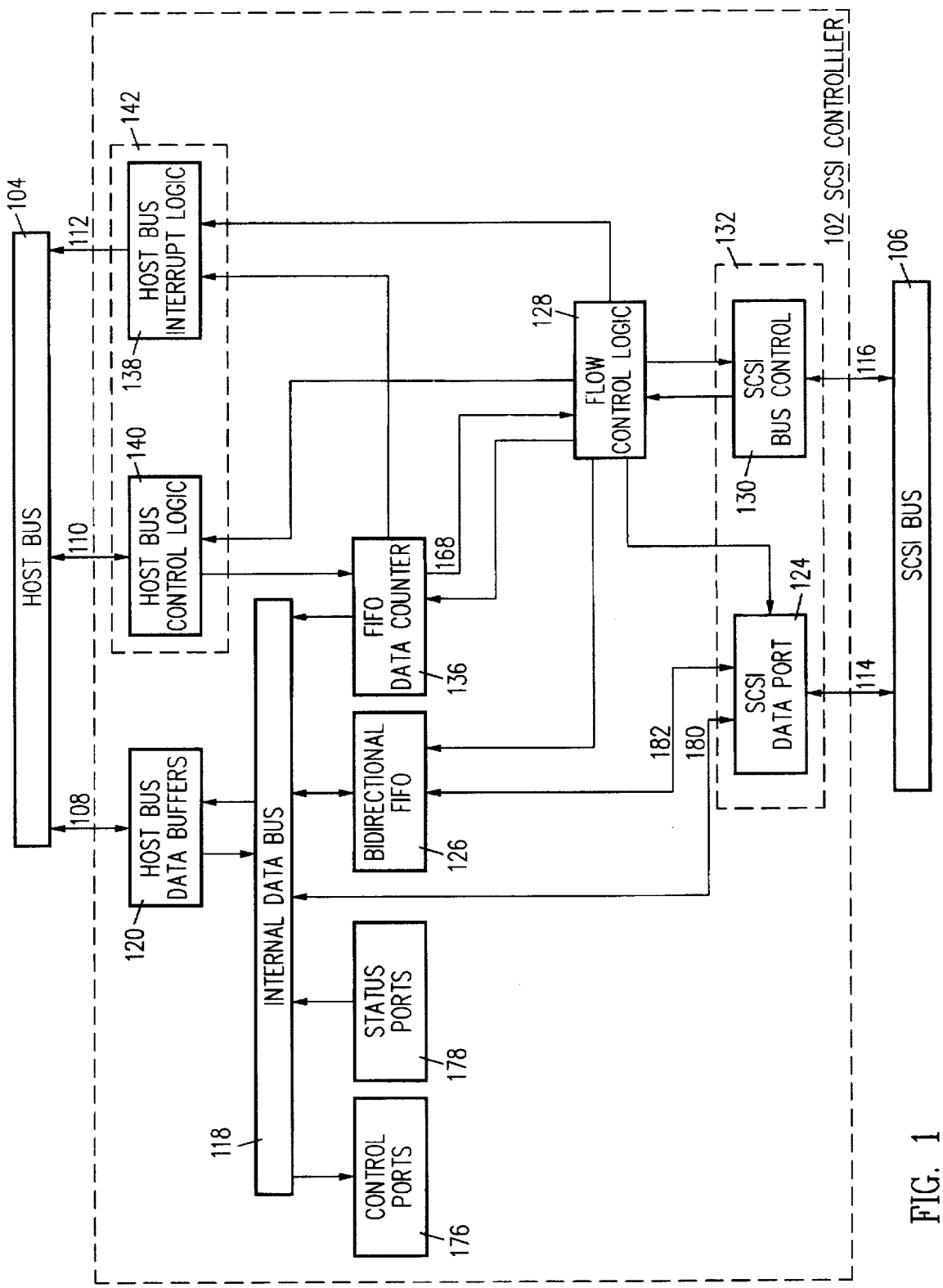
FIGURE 1 is a block diagram of a preferred embodiment in accordance with the apparatus of the present invention giving a general system overview.

Referring to FIGURE 1, an apparatus in accordance with a preferred embodiment of the present invention is shown. The apparatus is generally designated by reference numeral 102, and generally comprises a Small Computer Systems Interface (SCSI) controller circuit. The SCSI controller is depicted by a functional block diagram of the preferred embodiment of the present invention. The SCSI controller circuit, 102 is adapted for interconnection between the host computer bus, shown generally at 104, and the SCSI bus, shown generally at 106. For convenience, the host computer bus has been broken into the following components: host data bus 108, host bus control 110 and host interrupt 112. Similarly, the SCSI bus is illustrated as comprising the SCSI data bus 114 and SCSI control bus 116. The SCSI controller circuit 102 includes an internal data bus 118.

The host data bus 108 is connected to the internal data bus 118 through a data bus buffer 120. The SCSI data bus 114 is likewise provided with a SCSI interface means 132. SCSI interface means 132 includes SCSI data port 124 and SCSI bus control 130. The SCSI data port 124 is coupled to the internal data bus 118 through two alternate paths, a SCSI I/O port data path 180 and a bidirectional FIFO data path 182. The FIFO data path 182 connects a FIFO 126 between the internal data bus 118 and the SCSI data port 124. The FIFO 126 is controlled by data flow control logic 128. The data flow control logic 128 is in turn controlled by SCSI control logic 130, which is responsive to signals on the SCSI control bus 116. In the presently preferred embodiment FIFO 126 is an 8 kilobyte FIFO, although larger or smaller FIFOs are possible. The SCSI data port 124 may optionally contain smaller FIFOs to accommodate synchronous data transfers as defined in the SCSI spec. but are not essential to the invention.

The circuit 102 includes a FIFO data counter 136 which is coupled to the data flow control logic 128 and also to the internal data bus 118. The FIFO data counter monitors the fullness of FIFO 126 and provides a numeric value indicative of fullness which the host computer can access to determine the appropriate block size for data transfers. Host bus logic means 142 includes host bus control logic 140 and host bus interrupt logic 138. The FIFO data counter is coupled to interrupt logic 138 and is thereby able to send an interrupt to the host computer on its host interrupt bus. The circuit also includes control logic 140, coupled to the host bus control lines 110.

FIFO 126 may be implemented using any known method, such as a fall-through architecture or a RAM with read and write address pointers.

Data flow control logic 128 controls transfers between the FIFO 126 and the SCSI data port 124. The status of FIFO 126 is provided to the data flow control logic via the FIFO status signal 168.

The data flow control logic 128 is responsible for coordinating incoming SCSI requests with outgoing SCSI acknowledge signals. The SCSI control logic block 130 receives request (REQ) signals from the SCSI control bus 116 and provides an indication thereof to the data flow control logic 128. The data flow control logic 128 can command the transfer of data between the FIFO 126 and the SCSI data port 124. Completion of the transfer causes SCSI control logic 130 to place an acknowledge (ACK) on the SCSI control bus 116

Being an I/O mapped implementation, the circuit of the invention provides a plurality of control ports and status ports which the host computer may access for performing desired functions and gaining certain information. In FIGURE 1. the control ports are designated generally by reference numeral 176 and the status ports by reference numeral 178.

It should be appreciated that there is a direct path between the host data bus 108 and the SCSI data bus 114 which includes host bus data buffers 120, internal data bus 118, SCSI data path 180, and SCSI data port 124. There is also an indirect path between the host data bus 108 and the SCSI data bus 114 which includes host bus data buffers 120, internal data bus 118, FIFO 126, FIFO data path 182, and SCSI data port 124. The direct path provides means of transferring messages and status (and. optionally. commands and data) between the host computer and the SCSI bus 106. The indirect path provides means for buffered transfer of commands and data between the host and the SCSI bus 106.

The flow control logic 128 permits data transfers between the FIFO 126 and the SCSI data port 124 in command phase, in addition to the previously implemented data phase transfers. Previous SCSI controllers have implemented command phase transfers using the more direct path from the host bus 108 to the SCSI port 124, which requires polling of the SCSI bus Request/Acknowledge state through status port 178 before each command byte. Other controllers use a separate command FIFO. In the present invention, performance of a SCSI host adapter is enhanced by reducing overhead in the transmission of commands over the SCSI bus without the additional hardware of a command FIFO.

Flow control 128 is modified from that of previous designs to permit transfers between FIFO 126 and SCSI data port 124 during command phase. Software written for this controller may load command bytes into FIFO 126, without polling, before or during command phase.

Because each SCSI command is a predetermined length, the SCSI target device will request the exact number of bytes that make up the command. Software can begin to load data bytes into FIFO 126 even before the command phase ends provided that the data is being transferred from the host to the target (i.e., outbound). For inbound data (i.e. from target to host), the host must wait until the command the phase is over and data in phase begins. Since the target requests the exact number of command bytes required, there is no need for means internal to controller 102 to delineate the boundary between command information and data information in the FIFO 126.

Status ports 178 provide information on the state of the SCSI request and acknowledge signals, as well as the current SCSI phase.

Unlike previous implementations, internal logic 138 is constructed so that interrupts are not generated by SCSI requests in command phase, unless FIFO 126 is empty when the request is asserted. This prevents unnecessary interrupts when the controlling software is interrupt-driven.

Those skilled in the art can now appreciate from the foregoing description that the broad teachings of the present invention can be implemented in a variety of forms. Therefore, while this invention has been described in connection with particular examples thereof, the true scope of the invention should not be limited since other modifications will become apparent to the skilled practitioner upon study of the drawings, specification and following claims.

What is claimed is:

1. A computer system interface controller for interconnecting a host computer bus of a host computer to a peripheral device on a SCSI bus, wherein information is transferred between said host computer and said peripheral device during command phases and data phases, the computer system interface controller comprising:

an internal data bus coupled between said host computer bus and said SCSI bus;

a set of host data bus buffers connected between said internal data bus and said host computer bus wherein said set of host data bus buffers transfer command bytes for SCSI command phases and data bytes for SCSI data phases between said internal data bus and said host computer bus;

a SCSI data port coupled between said internal data bus and said SCSI bus wherein said SCSI data port transfers over a common path data bytes for SCSI data phases and command bytes for SCSI command phases between said internal data bus and said SCSI bus;

a shared buffer coupled between said internal data bus and said SCSI data port wherein the shared buffer receives a command byte provided by said host computer during a SCSI command phase and a data byte, for a SCSI data phase, provided by said host computer during said command phase;

a flow control logic circuit connected to said shared buffer, said SCSI data port, and coupled to said host computer bus wherein said flow control logic circuit provides directional flow control signals to said shared buffer, said SCSI data port, and said host computer bus; and a data counter connected between said flow control logic circuit and said internal data bus wherein said data counter counts the number of bytes of information provided to said shared buffer and generates a command to said flow control logic circuit to provide said directional flow control signals in response thereto.

2. The computer system interface controller according to claim 1, wherein said data counter monitors the number of bytes contained within said shared buffer and provides a numeric value indicative of the number of said bytes to the host computer, the host computer providing additional command or data bytes to said shared buffer in response to said numeric value.

3. The computer system interface controller according to claim 1, wherein said shared buffer is a FIFO.

4. A computer system interface controller according to claim 1, wherein the command byte comprises a byte in a command block, the command block being written to the shared buffer during said SCSI command phase.

5. A computer system interface controller according to claim 4, wherein the data byte comprises a data byte in a first data block portion and a second data block portion, the first data block portion, for said SCSI data phase, being written to the shared buffer during the command phase, the second data block portion being provided to said internal data bus during said SCSI data phase.

6. A computer system interface controller as in claim 1 further comprising:
a SCSI control logic circuit connected between said SCSI bus and said flow control logic circuit.

7. A computer system interface controller as in claim 1 further comprising:
a host computer bus interrupt logic circuit connected between said host computer bus and said data counter.

8. A computer system interface controller as in claim 7 further comprising:
a host computer bus control logic circuit connected between said host computer bus and said data counter.

9. A computer system interface controller as in claim 1 further comprising:
a host computer bus control logic circuit connected between said host computer bus and said data counter.

10. A computer system interface controller for interconnecting a host computer bus of a host computer to a peripheral device on a SCSI bus, wherein information is transferred between said host computer and said peripheral device during command phases and data phases, the computer system interface controller comprising:
an internal data bus;
a host data bus buffer connected between said internal data bus and said host computer bus wherein said host data bus buffer transfers command bytes for SCSI command phases and data bytes for SCSI data phases between said internal data bus and said host computer bus;
a SCSI data port connected to said SCSI bus, and directly connected to said internal data bus wherein said SCSI data port transfers over a common path data bytes for SCSI data phases and command bytes for SCSI command phases to and from said SCSI bus;
a shared buffer connected to said internal data bus and to said SCSI data port wherein the shared buffer receives a command byte provided by said host computer during a SCSI command phase and a data byte for a SCSI data phase provided by said host computer during said command phase;
a flow control logic circuit connected to said shared buffer, said SCSI data port, and coupled to said host computer bus wherein said flow control logic provides directional flow control signals to said shared buffer, said SCSI data port, and said host computer bus; and
a data counter connected between said flow control logic circuit and said internal data bus wherein said data counter counts the number of bytes of information provided to said shared buffer and generates a command to said flow control logic circuit to provide said directional flow control signals in response thereto.

11. A computer system interface controller as in claim 10 further comprising:
a SCSI control logic circuit connected between said SCSI bus and said flow control logic circuit.

12. A computer system interface controller as in claim 10 further comprising:
a host computer bus interrupt logic circuit connected between said host computer bus and said data counter.

13. A computer system interface controller as in claim 10 further comprising:
a host computer bus control logic circuit connected between said host computer bus and said data counter.

14. A computer system interface controller for interconnecting a host computer bus of a host computer to a peripheral device on a SCSI bus, wherein information is transferred between said host computer and said peripheral device during command phases and data phases, the computer system interface controller comprising:
an internal data bus;
a host data bus buffer connected between said internal data bus and said host computer bus wherein said host data bus buffer transfers command bytes for SCSI command phases and data bytes for SCSI data phases between said internal data bus and said host computer bus;
a SCSI data port coupled between said internal data bus and said SCSI bus wherein said SCSI data port transfers over a common path data bytes for SCSI data phases and command bytes for SCSI command phases to and from said SCSI bus;
a shared buffer connected to said internal data bus and to said SCSI data port wherein the shared buffer receives a command byte provided by said host computer during a SCSI command phase and a data byte for a SCSI data phase provided by said host computer during said command phase;
a flow control logic circuit connected to said shared buffer, said SCSI data port, and coupled to said host computer bus wherein said flow control logic provides directional flow control signals to said shared buffer, said SCSI data port, and said host computer bus;
a SCSI control logic circuit connected between said SCSI bus and said flow control logic circuit;
a data counter connected between said flow control logic circuit and said internal data bus wherein said data counter counts the number of bytes of information provided to said shared buffer and generates a command to said flow control logic circuit to provide said directional flow control signals in response thereto;
a host computer bus interrupt logic circuit connected between said host computer bus and said data counter; and
a host computer bus control logic circuit connected between said host computer bus and said data counter.

15. A computer system interface controller as in claim 14 wherein said SCSI data port is connected directly to said internal data bus.

* * * * *